United States Patent [19]
Bond et al.

[11] 4,051,231
[45] Sept. 27, 1977

[54] PRODUCTION OF INTERNAL ATMOSPHERES FOR KILNS

[75] Inventors: Desmond H. Bond; George W. Taggart, both of Dallas; Kurt S. Jaeger, Hurst, all of Tex.

[73] Assignee: Ford, Bacon & Davis Texas, Inc., Garland, Tex.

[21] Appl. No.: 672,408

[22] Filed: Mar. 31, 1976

Related U.S. Application Data

[62] Division of Ser. No. 508,671, Sept. 23, 1974, Pat. No. 3,963,443.

[51] Int. Cl.² .............................. B01J 7/00; C01B 1/00; F27B 1/26; G05D 23/00
[52] U.S. Cl. ................................. 423/659; 23/262; 23/281; 236/15 BD; 236/78 A; 252/372; 252/373; 252/376; 432/29; 432/36; 432/222
[58] Field of Search .................... 23/281, 262; 431/12, 431/90, 174, 175, 284, 285, 353; 432/29, 36, 222; 236/15 BB, 15 BD; 252/376; 266/87, 88; 423/659

[56] References Cited
U.S. PATENT DOCUMENTS

| | | | |
|---|---|---|---|
| 2,174,663 | 10/1939 | Keller | 236/15 BD X |
| 2,370,897 | 3/1945 | Whitcomb | 431/12 X |
| 2,408,114 | 9/1946 | Urquhart | 431/90 X |
| 2,628,830 | 2/1953 | Kerr | 266/88 |
| 3,108,790 | 10/1963 | Agarwal | 432/29 X |
| 3,376,098 | 4/1968 | Pryor | 431/12 X |

*Primary Examiner* — Joseph Scovronek
*Attorney, Agent, or Firm* — Richards, Harris & Medlock

[57] ABSTRACT

A gas mixer and reactor is provided which includes an elongated gas flow chamber with a nozzle arrangement at its inlet end for passing a first gaseous reactant into the interior of the chamber, toward the outlet of the chamber from points uniformly about the inner periphery of the chamber, and an annular nozzle arrangement near the outlet of the gas flow chamber for directing another gaseous reactant, or reactants, through the outlet of the gas flow chamber and into a thermal reaction chamber which communicates with the outlet of the gas flow chamber. In this manner controlled amounts of gaseous reactants may be thoroughly admixed and reacted to produce an atmosphere of desired composition. Atmospheres for kilns having controlled amounts of free hydrogen, carbon monoxide, oxygen, or carbon for example, are produced by burning controlled ratios of fuel, air and in some cases an inert gas, mixed by the reactor.

7 Claims, 5 Drawing Figures

PRODUCTION OF INTERNAL ATMOSPHERES FOR KILNS

BACKGROUND OF THE INVENTION

This is a divisional application of co-pending U.S. patent application Ser. No. 508,671 filed Sept. 23, 1974, now U.S. Pat. No. 3,963,443, issued June 15, 1976. This invention relates to gas mixers and reactors. In another aspect, this invention relates to gas burners. Still another aspect of this invention relates to a novel method and means for controlling the combustion of gaseous components. In still another aspect this invention relates to an apparatus for producing atmospheres for kilns.

Apparatus for reacting and combusting gaseous components wherein the relative quantities of gaseous reactants must be precisely controlled, such as substoichiometric burners, require not only means to effect an efficient mixing operation but sufficient flow control features to allow proper metering of the reactant materials. Most gas burners do not provide these features. Furthermore, conventional such burners and the like are subject to heat and/or chemical deterioration and do not provide a good visual contact with the combustion zone.

Improvements have been attempted in acid gas burners and similar gas reactors to provide for a thorough admixing of the gaseous reactants but yet diminish both thermal and chemical deterioration of metal parts. An example of such apparatus is disclosed in U.S. Pat. No. 3,782,884.

SUMMARY OF THE INVENTION

According to one embodiment of the subject invention a gas mixer and reactor is provided which comprises an elongated gas flow chamber with nozzle means at its inlet end for introducing a uniform flow of gas about its inner periphery, a thermal reaction zone operatively communicating with the outlet end thereof and a second nozzle means positioned about the outlet end of said gas flow chamber to direct at least one gaseous component inwardly into the gas flow chamber at an angle toward the thermal reaction chamber. The positioning of the first and second nozzle means provides for thorough intermixing of the gaseous components, by the time they reach the thermal reaction zone, and the elongated configuration of the reactor allows for visual contact in the combustion zone while minimizing unwanted thermal convection and radiation thereto and chemical deterioration thereof. According to a preferred embodiment of said one embodiment, the thermal reaction zone comprises a shortened tubular member having its inlet end contiguous with the outlet of the gas flow chamber, and an inset annular step at the opposite end thereof thereby forming the outlet opening thereof.

According to another embodiment of the subject invention a novel process is provided for admixing and reacting gaseous components which comprises introducing a first gaseous component into an elongated gas flow zone at points uniformly about the inner periphery thereof, i.e. radially; flowing the first gaseous component axially through said elongated gas flow zone; injecting a second gaseous component into the first gaseous component as it passes from said elongated gas flow zone from multiple points annular of said zone and in the direction of the flow of the first gaseous component causing a thorough mixing of the first and second gaseous components; and passing the first and second gaseous components while admixing into a reaction zone wherein the components are reacted. The process carried out in accordance with this embodiment results in an extremely efficient mixing of the gaseous components while they are reacted. The second gaseous component can comprise one or more reactants. Furthermore the second gaseous component is injected into the first gaseous component in one of two preferred modes. The first mode includes injecting the second gaseous component generally from annular arranged nozzles positioned near the outlet of the gas flow zone such that their point of impingement will be within mid-portion of the thermal reaction zone. The second preferred mode is to inject the second gaseous component from nozzles positioned around the outlet of the elongated gas flow zone but positioned in a skewed manner such that they will impinge at the point of intersection between above described inset step and the inside wall of the thermal reaction zone of said preferred embodiment.

The process of the above embodiment can be used to effect any gaseous reaction with either stoichiometric or substoichiometric quantities of reactants. For example, the above-described process is utilized in the production of clay products to produce atmospheres which are free of hydrogen or carbon monoxide, oxygen, or high hydrogen and free carbon, for example. Alternately, a neutral atmosphere can be produced.

BRIEF DESCRIPTION OF THE DRAWINGS

This invention can be more easily understood from the study of the drawings in which.

DETAILED DESCRIPTION OF THE INVENTION

Figure 1:
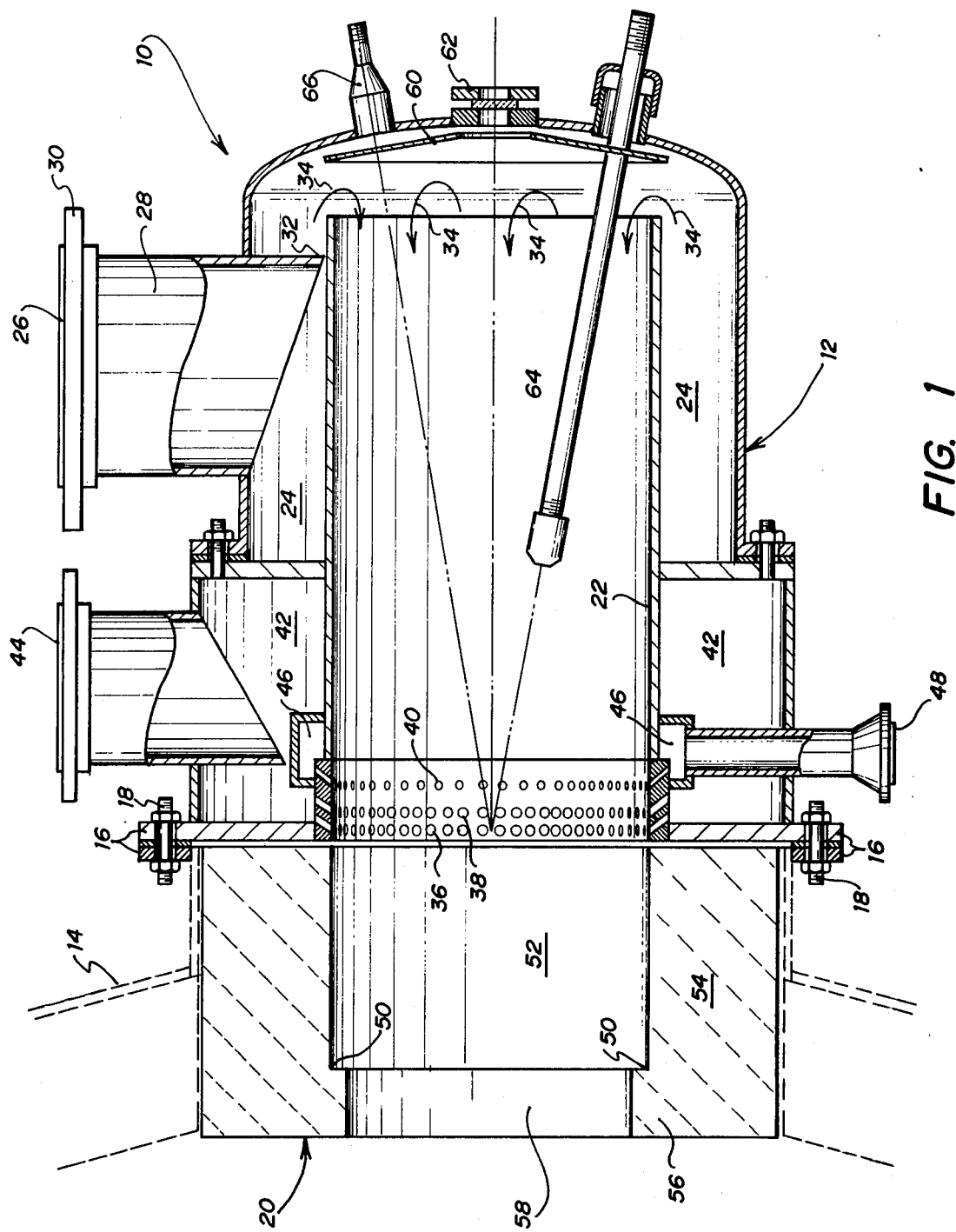
FIG. 1 is a sectional view of a preferred gas mixer and reactor of the subject invention.

Now referring to FIG. 1, a preferred embodiment of the subject invention is shown as gas mixer and reactor 10. Gas mixer and reactor 10 basically comprises a metallic gas injector member 12 which is attached to a furnace 14 via flanges 16 and nut and bolt assemblies 18, and tile member 20 which forms the inlet of furnace 14.

Elongated gas flow chamber 22 is positioned within gas injector member 12 and communicates with gas supply manifold 24 on its inlet end and with tile member 20 on its outlet end. It is noted that elongated gas flow chamber 22 can have any convenient cross-sectional configuration such as for example oval, rectangular or square, but it is preferred that it have a circular cross-sectional configuration and comprise a cylindrical shape. Therefore, elongated gas flow chamber 22 will hereinafter be described as having a generally circular cross-sectional area. Gas supply manifold 24 is positioned around the first end of elongated gas flow chamber 22 and communicates with gas inlet port 26. Gas inlet port 26 basically comprises a cylindrical inlet member 28 with suitable connecting flange 30. The internal end 32 of cylindrical member 28 extends to a point closely adjacent to the sidewall of elongated gas flow chamber 22 and is cut in a tapered manner as shown in the drawings to provide a baffle or is otherwise baffled to assure that gas passing through the inlet port 26 will uniformly fill the manifold 24 and pass into the interior of the elongated gas flow chamber 22, radially, (in an annular flow path as illustrated by arrows 34.) It is noted that in some instances the baffle can be totally eliminated, if desired.

Three rows of apertures 36, 38 and 40 are positioned about the outlet end of elongated gas flow chamber 22. As shown, nozzle apertures 36 and 38 communicate with annular gas manifold 42. Gas inlet port 44 which is a similar configuration to gas inlet port 26 operatively communicates with annular gas manifold 42. Similarly, nozzle apertures 40 communicate with annular gas manifold 46 which in turn operatively communicates with gas inlet port 48. As shown, nozzle apertures, 36, 38 and 40 are angled toward the interior of tile member 20. In a preferred embodiment nozzle apertures 36, 38 and 40 are angled for impingement at the center line or axis of the reaction chamber 52 within tile member 20. According to an alternate preferred embodiment, nozzles 36, 38 (and 40, if desired) are skewed in relation to one another and directed toward impingement at points 50 within tile member 20. It should be noted that the subject invention can utilize any number of nozzle apertures such as 36, 38 and 40 spaced relative to one another in any desired number of rows, but three rows of such nozzle apertures are shown together with the annular gas manifolds 42 and 46 for illustrative purposes only.

Tile member 20 basically comprises a short cylindrical reaction chamber 52 made from ceramic tile members 54. Inset annular step 56 is positioned at the outlet of reaction chamber 52 and extends inwardly in an annular manner to thereby form an outlet aperture 58 which is smaller in diameter than the interior of reaction chamber 52.

Radiation shield 60 is positioned adjacent the inlet end of elongated gas flow chamber 22 and comprises a dish shaped member having a reflective surface which faces the interior of elongated gas flow chamber 22. Sight port 62 is positioned behind radiation shield 60 on the axis of elongated gas flow chamber 22. Pilot burner 64 extends through the sidewall of gas injector member 12, radiation shield 60, and to a point adjacent the midportion of elongated gas flow chamber 22 as shown in FIG. 1. Furthermore, scanner mount 66 is positioned through the sidewall of gas injector member 12 and in alignment with suitable aperture means through radiation shield 60. As shown in broken lines in FIG. 1 a focal point between the projection of pilot burner 64, sight port 62, and scanner mount 66 exists at the end of elongated gas flow chamber 22.

Figure 2:
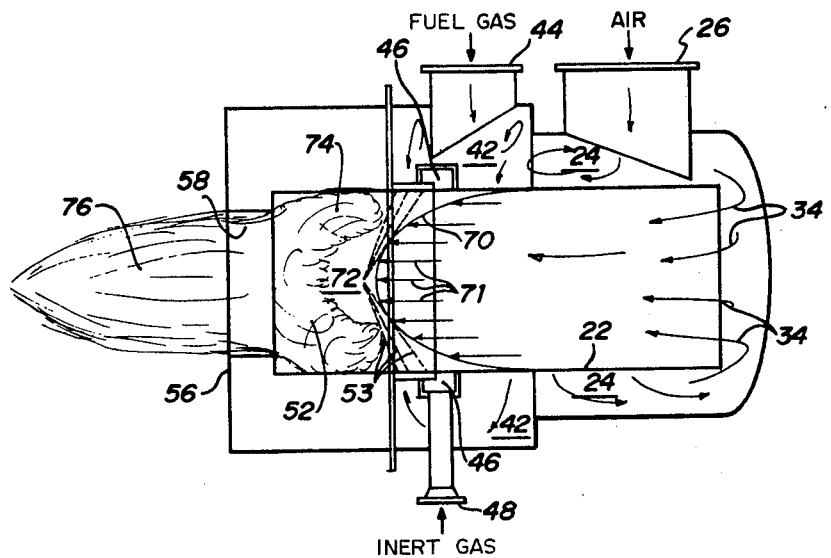
FIGS. 2 through 4 are schematic views showing various modes of operation of the apparatus set forth in FIG. 1.
Figure 3:
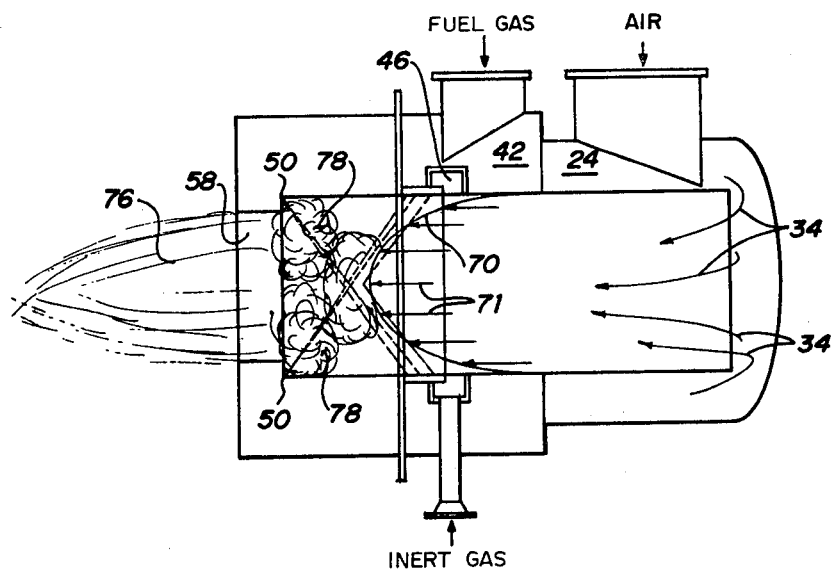
Figure 4:
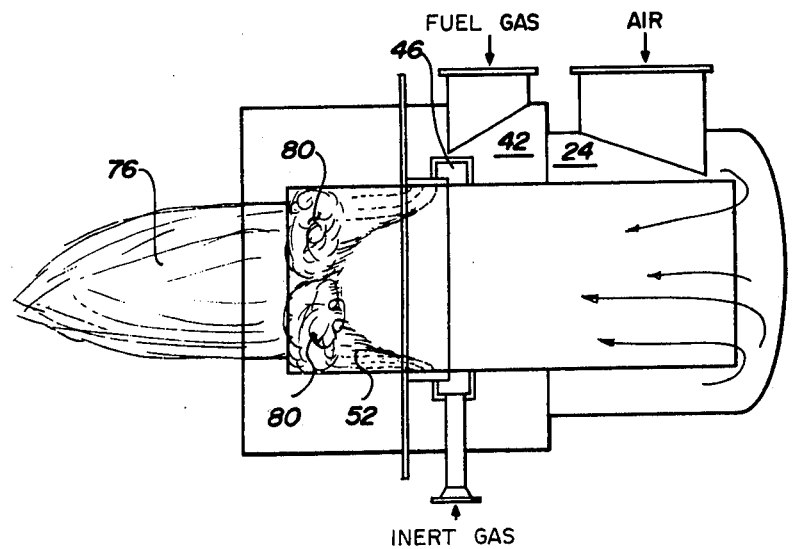

The gas mixer and reactor 10 can be utilized to react various gaseous constituents in three basic modes of operation as illustrated in FIGS. 2, 3 and 4. The three basic modes of operation of gas mixer and reactor 10 will be illustrated in relation to the process of producing an atmosphere to be used in a kiln. In this process, air is preferably delivered to gas manifold 24 via gas inlet port 26, the fuel gas is delivered to annular gas manifold 42 via gas inlet port 44 and an inert gas is delivered to gas manifold 46 via gas inlet port 48. Thus, fuel gas is delivered from nozzle apertures 36 and 38 while inert gas is delivered from nozzle apertures 40.

The first mode of operation is shown in FIG. 2 which utilizes relatively high flow rates of all three gaseous streams, and nozzle apertures 36, 38 and 40 are angled in such a manner as to converge on the centerline of the short cylindrical reaction chamber 52, and within reaction chamber 52. The fuel and air are delivered in ratios such that the desired atmosphere results upon combustion. Inert gases may be employed to further control the resulting atmosphere. For example, atmospheres may be produced which are either free or high in hydrogen, carbon monoxide, oxygen or free carbon.

As shown in FIG. 2, the nozzle apertures 36, 38 and 40 are directed into the reaction chamber 52 and impinge at the center line or axis of reaction chamber 52 as shown by arrows 33. The air is introduced through gas port 24 and passes around the annular gas flow manifold 24 and then radially into the interior of elongated gas flow chamber 22 as shown by arrows 34. The introduction of the air in a uniformly annular manner about the inner periphery of elongated gas flow chamber 22 results in a substantially parabolic velocity front 70 as depicted by flow arrows 71 in FIG. 2. This substantially parabolic velocity front passes through the elongated gas flow chamber 22 into the turbulent region 72 formed by impingement of the fuel gas and inert gas streams within reaction chamber 52 to form a uniform mixture depicted as 74 of air, inert gas and fuel gas which is ignited (initially by the action of the pilot burner 64 not shown in FIG. 2). It is noted that the action of inset annular step 56 on the gas mixture results in further turbulence and further admixing as combustion occurs and the combusting mixture of expanding gases 76 exit via outlet aperture 58.

In the second mode of operation as schematically depicted in FIG. 3, the gas flow rates of all three streams are generally high as described in FIG. 2 but nozzle apertures 36 and 38 and if desired, 40, are skewed and directed toward points 50 which comprises the intersection between inset annular step 56 and the internal periphery of reaction chamber 52. When operating in this mode the air is passed radially inwardly into the interior of elongated gas flow chamber 22 as described in relation to FIG. 2 to form the substantially parabolic velocity front 70. Furthermore, the fuel gas passing from nozzle apertures 36 and 38 impinges upon points 50 to form areas of turbulence 78. The nozzle apertures 40 can either be skewed to contact points 50 or merely aimed at the center line of reaction chamber 52 in a manner described above in relation to FIG. 2. As shown in FIG. 3, nozzle apertures 40 are angled to impinge on the center line within reaction chamber 52. The substantially parabolic velocity front of air 70 contacts the points of impingement and turbulence thereby created at 78 to form a uniform mixture of the air and fuel gas. The mixture is ignited initially by the action of pilot burner 64 to form the combusting mixture 76 which is passed into the kiln via aperture 58.

The third mode of operation is schematically illustrated in FIG. 4. In this mode of operation the gas flow rates from apertures 36, 38 and 40 is relatively low. As shown, the flow rates of fuel gas and inert gas from nozzle apertures 36, 38 and 40 are not of sufficient velocity to cause impingement either at the center line within reaction chamber 52 or at points 50 opposite the nozzle apertures. The flows from these nozzle apertures merely trails along the inner periphery of reaction chamber 52 with only a small amount of mixing occurring with the air stream until contact is made with inset annular step 56. At this point turbulent areas 80 result to cause intimate admixture of the inert gas, fuel and air. The mixture is ignited and the combusting mixture 76 is passed from the thermal reaction zone via outlet aperture 58. In this mode, with the low flow rates, it is many times necessary to maintain a constant pilot flame emitting from pilot burner 64 (not shown in FIG. 4).

It is noted that in all three modes of operation as described above in relation to FIGS. 2, 3 and 4 the interior of reaction zone 52 is readily viewable via sight port 62 (FIG. 1). In addition, since the gas flows are constantly passing from gas injection member 12 to the interior of the ceramically lined tile member 20, and because of the relatively great distance from the metal parts within gas injector member 12 from reaction chamber 52, thermal convection and heat deterioration of the metal parts within the gas injector member 12 are diminished. In addition, the orientation of elongated gas flow chamber 22 is such that the gases flowing therethrough provide a cooling effect for all metal parts. Furthermore, elongated gas flow chamber 22 is so disposed as to be shielded from radiation. Furthermore, very little corrosive action can occur to the metal parts within the gas injector member 12 since the mixing and combusting operations mainly occur within the tile member 20.

Figure 5:
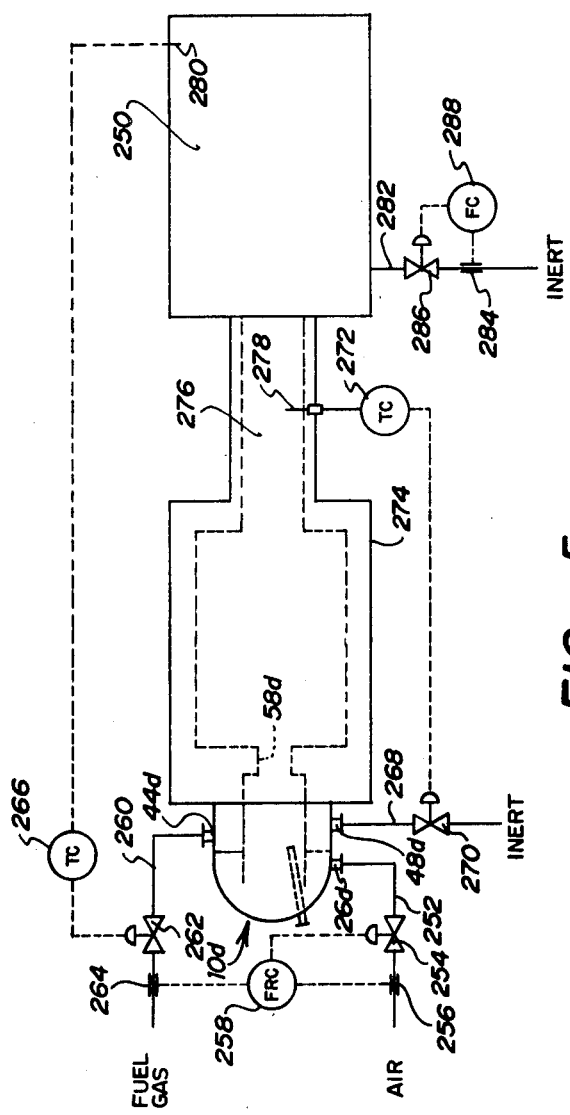
FIG. 5 is a schematic illustration of another embodiment of the subject invention showing the gas mixer and reactor of the subject invention as a kiln atmosphere controller.

Now referring to FIG. 5, a process is schematically depicted illustrating the gas mixer and reactor of the subject invention as gas mixer and reactor 10d. In this embodiment, gas mixer and reactor 10d is utilized to control the atmosphere within kiln 250. Gas mixer and reactor 10d is schematically depicted but can have the basic configuration shown in FIG. 1. Accordingly, air conduit 252 operatively communicates with gas inlet port 26d and has flow control valve 254 and flow rate sensor 256 operatively disposed therein. Valve 254 communicates with the output of flow ratio controller 258, and flow rate sensor 256 communicates with an input of flow ratio controller 258 as schematically depicted as FIG. 5. Gas inlet port 44d is in communication with fuel gas conduit 260. Fuel gas conduit 260 has flow control valve 262 and flow rate sensor 264 operatively disposed therein. Valve 262 is operatively connected to the output of temperature controller 266 and flow rate sensor 264 is operatively connected to an input of flow ratio controller 258. Inert gas inlet conduit 268 operatively communicates with gas inlet port 48d and has valve 270 disposed therein. Valve 270 is operatively connected to the output of temperature controller 272. The outlet 58d of gas mixer and reactor 10d communicates with the interior of furnace chamber 274. The duct 276 which forms the outlet of furnace chamber 274 communicates with the interior of kiln 250. Temperature sensor probe 278 communicates with the interior of duct 276 and transmits an input to temperature controller 272. In similar manner, temperature probe 280 communicates with the interior of kiln 250 and communicates an input to temperature controller 266.

In operation, gas mixer and reactor 10d is supplied with a light hydrocarbon fuel or natural gas via conduit 260. This fuel is burned in such a way to produce atmospheres which can be either free of or high in hydrogen, carbon monoxide, oxygen and free carbon. An essentially neutral atmosphere exists at stoichiometric combustion conditions. With appropriate controls, firing rates can be varied to obtain desired time, composition, and temperature.

Moderation of the temperature within kiln 250 is obtained by introducing an inert gas through conduit 268. The inert gas is introduced through conduit 268 in response to temperature controller 272. This inert gas can comprise carbon dioxide, nitrogen, recycled products of combustion or any other inert gas which is nondeleterious to the kiln atmosphere. Inert fluid conduit 282 operatively communicates with the interior of kiln 250 and has flow sensor 284 and flow control valve 286 operatively positioned therein. Flow sensor 284 is operatively connected to the input of flow controller 288 and flow control valve 286 is operatively connected to the output of flow controller 288. This arrangement will provide a constant uniform flow of an inert gas into the interior of kiln 250. The inert gas can be the same type as passed through conduit 268. Thus temperature controller 272 can be preset at any suitable temperature and correlated with valve 270 to result in any desired temperature of the gases passing through duct 276. Likewise, temperature controller 266 can be correlated with valve 262 to cause increases and decreases in the kiln temperature as desired.

As an example of suitable operation, when gas mixer and reactor 10d is employed to produce an atmosphere containing free carbon the air rate can be adjusted to 16,000 standard cu. ft. per hour with a methane rate of 3200 standard cu. ft. per hour; and with the same air rate an oxygen free slightly reducing atmosphere is created by supplying methane at 1800 standard cu. ft. per hour. Furthermore, with the same air rate a neutral atmosphere is provided by supplying methane at 1750 standard cu. ft. per hour. Still furthermore, at the same air rate, a hydrogen free slightly oxidizing atmosphere is produced by supplying methane at a rate of 1700 standard cu. ft. per hour. Furthermore, still at the same air rate, an oxygen rich atmosphere provided by supplying the methane at a rate of 875 standard cu. ft. per hour.

In the operation of the process as depicted in FIG. 5, the neutral condition is the highest inert temperature condition, the theoretical flame temperature being about 3725° F. Inert gas can be injected via nozzle apertures 40 and gas inlet 48d to reduce the temperature. For example, at the stoichiometric rates cited (1750 standard cu. ft. per hour of methane and 16,000 standard cu. ft. per hour of air) about 4990 standard cu. ft. per hour of $CO_2$ will reduce the theoretical flame temperature about 1000° F. Introduction of $CO_2$ is done with 40 nozzle apertures each having a 7/32 inch diameter.

It is noted that while the above invention has been described in relation to its preferred embodiments, it is to to be understood that various modifications thereof will be apparent to one skilled in the art from the study of this specification and it is intended to cover such modifications as fall within the scope of the appended claims. For example, gas mixer and reactor can be utilized as either a natural or forced draft incinerator, for producing reducing gas for various operations such as smelting and metal working, heat treating and any other processes requiring hydrogen and/or carbon monoxide, and can be used in the production of carbon black and can be used to thermally decompose ammonia to produce hydrogen or with more oxygen to produce high purity nitrogen and in any indirect or direct heating operation and for boilers and many other combinations.

We claim:
1. An apparatus for controlling the internal atmosphere of a kiln comprising:
   a. an elongated gas flow chamber having a first end which carries an inlet thereto and a second end which carries an outlet therefor;
   b. a thermal reaction chamber communicating with said outlet at said second end of said elongated gas flow chamber and having an outlet spaced in alignment therefrom;

c. air injection means for injecting air into said elongated gas flow chamber through said inlet thereof toward said outlet thereof from points uniformly about the inner periphery of said elongated gas flow chamber;

d. first gas nozzle means positioned adjacent said second end and around said elongated gas flow chamber and directed into said elongated gas flow chamber and toward said thermal reaction chamber for passing a fuel gas thereto;

e. second gas nozzle means positioned adjacent said first gas nozzle means and around said elongated gas flow chamber and directed into said elongated gas flow chamber and toward said thermal reaction chamber for injecting inert gas thereto;

f. a furnace chamber having an inlet and an outlet with an inlet operatively communicating with the outlet of said thermal reaction chamber; and g. conduit means connecting the outlet of said furnace chamber with a kiln.

2. The apparatus of claim 1 further comprising an inset annular step in said thermal reaction chamber spaced from said outlet of said elongated gas flow chamber, the opening axial of said inset annular step forming said outlet of said thermal reaction chamber.

3. The apparatus of claim 2 further comprising temperature control means for controlling the quantity of inert gas passed through said second gas nozzle means in response to the temperature within said conduit means.

4. The apparatus of claim 3 further comprising temperature control means for controlling the relative quantity and amount of fuel and air passed to said air injection means and first nozzle means in response to temperature within said kiln.

5. An apparatus for controlling the internal atmosphere of a kiln comprising:

a. an elongated gas flow chamber having a first end which carries an inlet thereto and a second end which carries an outlet therefor;

b. a thermal reaction chamber communicating with said outlet at said second end of said elongated gas flow chamber and having an outlet spaced in alignment therefrom;

c. air injection means for injecting air into said elongated gas flow chamber through said inlet thereof toward said outlet thereof from points uniformly about the inner pheriphery of said elongated gas flow chamber;

d. an air flow source connected to said air injection means and comprising a valve means and a first flow rate sensing means having an input and an output;

e. first gas nozzle means positioned adjacent said second end and around said elongated gas flow chamber and directed into said elongated gas flow chamber and towards said thermal reaction chamber for passing a fuel gas thereto;

f. a fuel gas source connected to said first gas nozzle means and comprising a valve means and a second flow rate sensing means having an input and an output;

g. a flow ratio control means operatively connected with the outputs of said first and second flow rate sensing means of said air flow source and said fuel gas source for controlling the relative amounts of air, and fuel gas which are injected into said gas flow chamber;

h. second gas nozzle means positioned adjacent said first gas nozzle means and around said elongated gas flow chamber and directed into said elongated gas flow chamber and toward said thermal reaction chamber for injecting inert gas therein;

i. a furnace chamber having an inlet and outlet with its inlet operatively communicating with the outlet of said thermal reaction chamber;

j. conduit means connecting the outlet of said furnace chamber with a kiln;

k. an inert gas source connected with said second nozzle and comprising a valve means and a temperature control means operatively connected with said valve means such that the amount of the inert gas injected into said elongated gas flow chamber can be varied in response to fluctuations in the temperature of the gas passing through said conduit means connecting the outlet of said furnace chamber with said kiln; and l. temperature control means operatively connected with the valve means of said fuel gas source for sensing the temperature in said kiln and varying the amount of fuel gas injected into said elongated gas flow chamber in response thereto.

6. The apparatus of claim 5 further comprising an inset annular step in said thermal reaction chamber spaced from said outlet of said elongated gas flow chamber, the opening axial of said insert annular step forming said outlet of said thermal reaction chamber.

7. A process for producing atmospheres for kilns comprising:

a. creating an elongated air flow zone the outlet of which communicates with a thermal reaction zone wherein air is passed uniformly about the inner periphery of said air flow zone, toward said thermal reaction zone, in a parabolic velocity front;

b. injecting a fuel gas, in a controlled amount, from points radial of said elongated air flow zone and adjacent its outlet in a manner such that said fuel gas impinges the air being passed in said thermal reaction zone;

c. injecting an inert gas in a controlled amount from points adjacent to the points of injection of said fuel gas and in substantially the same direction as said fuel gas;

d. igniting the mixture of fuel gas, air, and inert gas in said thermal reaction zone to produce an atmosphere of desired composition; and e. passing said atmosphere of desired composition into a kiln.

* * * * *